May 19, 1931. R. H. UPSON 1,806,432
AIRPLANE CONTROL MECHANISM
Filed April 18, 1929 2 Sheets-Sheet 1
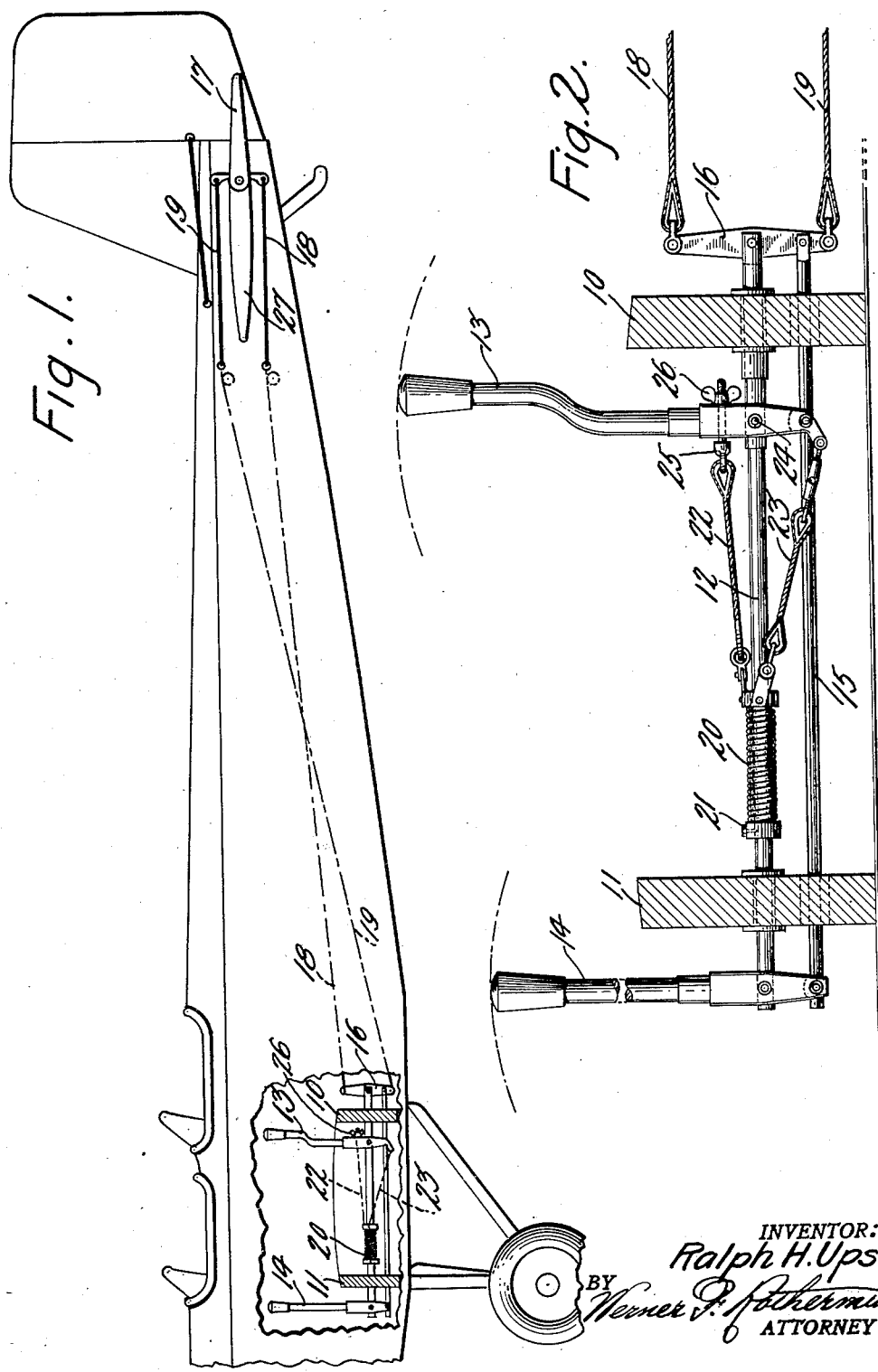
INVENTOR:
Ralph H. Upson
BY
ATTORNEY May 19, 1931.  R. H. UPSON  1,806,432
AIRPLANE CONTROL MECHANISM
Filed April 18, 1929  2 Sheets-Sheet 2

INVENTOR
Ralph H. Upson
BY
ATTORNEY

Patented May 19, 1931

1,806,432

UNITED STATES PATENT OFFICE

RALPH H. UPSON, OF RED BANK, NEW JERSEY

AIRPLANE CONTROL MECHANISM

Application filed April 18, 1929. Serial No. 356,114.

This invention relates to new improvements in the operation of control surfaces particularly for airplanes and more specifically the horizontal rudders or elevators of airplanes.

The tendency in airplane design at the present time is to provide so-called automatic or hands-off stability which means that if the control stick is pulled or pushed out of its neutral position and then let go the ship will tend to return to a normal flying attitude. This result is at the present time attained almost exclusively by means of a relatively fixed horizontal tail surface called the stabilizer to which the movable elevators are hinged. This stabilizer acts as a horizontal fin which for proper proportions and weight distribution tends to produce the desired stability. There are several disadvantages to this arrangement, however, notably as follows:

It has been found impracticable in most cases to depend on a permanently fixed stabilizer because it gives the correct balance only for one particular set of operating conditions, including the weight, center of gravity and engine speed. Most present-day airplanes, therefore, have an adjustable stabilizer the angle at which can be changed by the pilot to suit the requirements.

Considering the stabilizer and elevators together as a single airfoil surface the stabilizer forms the forward part which is the least effective portion with which to effect a change in the air force acting upon it.

If there is any friction in the control system the elevators will tend to stick in a position to produce a force in the wrong direction if the stick is released after pulling it out of the neutral position.

Even under ideal conditions of no internal friction the conventional elevator obviously gives no actually helpful force under the above conditions; for, if such a force were assumed the elevator would immediately yield in a direction to obliterate the force.

An object of the present invention is to overcome the above mentioned disadvantages of the adjustable stabilizer by the substitution of means whereby the elevator itself can be adjusted to return to any given setting when released, thereby adding its surface to the effective stabilizer surface, but at the same time permitting its full and instantaneous movement as a control surface by the conventional use of the control stick.

Although making use of one or more springs, this device must not be confused with other spring devices which have been used in the past, such as for adjustment only, to superimpose a certain force on the force transmitted by the control stick, or to give the elevator a general tendency to return to a neutral position such as may and has been accomplished by the use of two oppositely opposed springs. In none of these devices previously used is there any provision for bringing the elevator positively to a predetermined position, except by the elastic qualities of the springs themselves which would have to be made very stiff and unwieldy to accomplish even approximately the purpose of this invention. My device, on the other hand, as demonstrated by actual trial, adds very markedly to the stability without any considerable extra force being made necessary for manual control, even at extreme degrees of movement.

One of the prime objects of the present invention is to provide a simple and highly efficient means whereby the much desired so-called automatic or hands-off stability may be accomplished in an airplane without reconstruction of the standard equipment.

Various other objects and advantages of the invention will be in part obvious from an inspection of the accompanying drawings and a careful consideration of the following particular description and claims of one form of mechanism embodying my invention.

In the drawings:

Figure 1 is a fragmentary side view of an airplane provided with dual control and showing the present invention as applied thereto.

Figure 2 is a detail on a larger scale of the embodiment shown in Fig. 1.

Figures 3, 4:
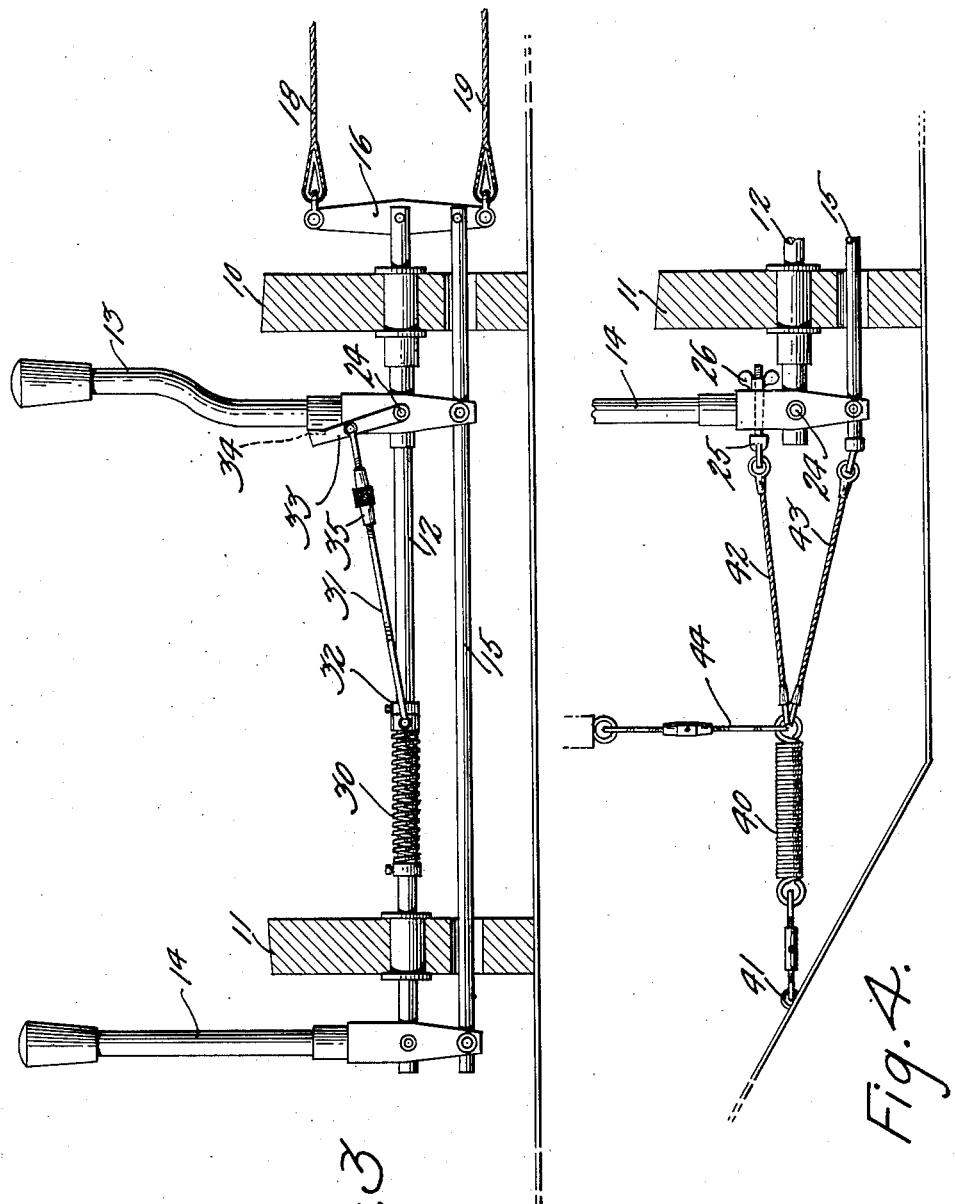
Figure 3 is an alternative structure producing the same effect.
Figure 4 is a further alternative structure arranged for a single control.

With reference to Figs. 1 and 2 of the drawings, 10 and 11 designate cross members that rotatably support the usual torque rod 12 on which are pivotally mounted for fore and aft movement the control sticks 13 and 14. The push-pull rod 15 is connected to the lower ends of the control sticks and can be swung about the axis of the torque rod 12 when the control sticks are moved laterally. A tiller 16 which is pivotally connected to the rods 12 and 15 is adapted to raise or lower the elevator 17 through the medium of the cables 18 and 19 when the control sticks are rocked fore and aft.

In this particular instance a tension spring 20 is mounted concentric with the torque rod 12 and secured thereto in an adjustable manner at 21, the free end of the spring 20 being connected by means of the links 22 and 23 to the stick 13 on opposite sides of the pivot 24 the link 23 being provided with an adjusting means 28. It will be seen that the linkages 22, 23 are connected to said lever in unequally spaced relation relative to the pivot 24. This effective change in leverage against the spring tension will accomplish the dual purpose of compensating for the weight of the elevator 17 which is supported by the link 23, and to facilitate a backward pull upon the stick 13 in an endeavor to raise the elevator against the air stream, which action will be made comparatively easy due to the more adjacent location of the link 22 relative to the pivot 24 and the resulting more effective leverage to overcome the spring. Furthermore, it will be seen that as the stick is released and returned to its neutral position by the spring tension, the lower link 23 will effectively act as a stop to prevent the stick from moving forward past the neutral position.

It will be noticed that the link 22 which is connected to the stick 13 closely adjacent to the pivot 24 by means of a ring bolt 25 which passes through the stick and is provided with a thumb nut 26 easily within reach of the pilot. This thumb nut provides the means by which the pilot, during flight, can readily adjust the position of the elevator 17 so that it will return to any desired setting when the control stick is released.

It will be understood that such an adjustment readily accessible as above described, is highly desirable so as to permit the pilot to compensate for variations in operating conditions. The elevator 17 thus set to meet any particular flying conditions, most effectively adds its surface to the relatively fixed surface of the usual stabilizer 27, but at the same time due to the provisions of this invention a full and instantaneous movement thereof as a control surface is permitted by the conventional operation of the control stick.

With reference to Fig. 3, the spring 30 in this instance is of the compression type and secured to the torque rod 12 in much the same manner as the one above described, the sliding end of the spring being connected to a forked rod 31 and restrained against full extension by a settable stop collar 32 secured to the rod 12. The rod 31 is attached to a lever arm 33 which is pivotally connected to the stick 13 at 24, said lever being provided with a lip portion 34 which engages the control stick when the latter is moved manually forward of the neutral position. In this instance the weight of the elevator tends to return it to neutral when the stick is pulled back, and a turnbuckle 35 provides the adjustment.

With reference to Fig. 4, the embodiment shown is more particularly adapted for a single control. The spring 40 in this instance is not mounted on the usual rod (it being inconvenient to extend the same that far) but is attached to any fixed portion of the fuselage as at 41. The links 42 and 43 are adjustably supported by a link 44 which may include a turnbuckle and which depends from another fixed portion of the fuselage but the link 44 is not essential if the links 42 and 43 are sufficiently long.

It should be understood from all the showings that the weight of the elevators is yieldingly supported by the springs in any desired position dependent on prevailing conditions; said weight being compensated for by the difference in leverage with which the links 22 and 23 (Fig. 2) and 42, 43 (Fig. 4) act on the stick 13, and in the case of Fig. 3 by leaving out entirely the link which pulls the stick forward.

In all cases however the spring is maintained under initial strain, and the leverage with which it acts on the control stick changes sharply as the stick is moved past the neutral position in either direction. This is the essential element of the present invention, which creates a positive and definite stop point, at the same time permitting easy manual operation of the controls, without accumulating any strongly resisting force even at large angles of movement.

Variations may be resorted to within the scope of the invention and portions of the improvements may be used without the others, whilst not departing from the spirit of the invention.

Having thus described my invention, I claim:

1. A device for neutralizing and counterbalancing a control surface, comprising a pivoted operating lever, a spring means having one end secured to produce initial strain and connected to said lever on opposite sides of the pivot in unequally spaced relation so as to maintain the control surface rigidly at a desired neutral point of operation except when said system is manually actuated.

2. In apparatus of the class described, the combination with a control surface, of a pivoted lever for the actuation of said control surface, a spring means under initial strain having one end fixed and the free end adjustably connected to said lever on either side of the pivot thereon in unequally spaced relation so as to better support said control surface and to prevent it dropping below the desired neutral point unless manually actuated.

3. In apparatus of the class described, the combination with a control surface, of a pivoted lever for the actuation of said control surface, a spring means under initial strain having one end fixed, a pair of linkages connecting the free end of the spring means to said lever unequally on either side of the pivot thereon, and means adapted to adjust the length of said linkages.

4. The combination with an airplane having a control surface, of a pivoted lever for the actuation of said control surface, a spring means under initial strain having one end fixed, a pair of linkages adapted to transmit force in only one direction and connecting the free end of the spring means to said lever on either side of the pivot thereon in unequally spaced relation, and means adapted to adjust the length of said linkages.

5. In apparatus of the class described, the combination with a control surface, of a pivoted lever for the actuation of said control surface, a spring means under initial strain having one end fixed, a pair of linkages connecting the free end of the spring means to said lever on either side of the pivot thereon; the leverage of said linkages being unequal and adapted to compensate for the weight of the control surface or for any other initial force which it may be required to carry.

6. In an airplane having control surfaces such as elevators, the combination of a control system for said surfaces, an actuating rod disposed longitudinally of said airplane, a control stick pivoted thereon for rocking movement longitudinally and laterally, a spring means being mounted concentric with said rod and connected to said stick in a manner as to sustain the control surfaces from dropping below a desired neutral position unless manually actuated.

7. The combination with an airplane having a movable control surface, of a control system adapted to actuate the surface comprising, a pivoted lever, a spring means adapted to maintain said surface and system at a desired neutral point of operation; connection for said spring means disposed at two points in unequally spaced relation to the pivot of said lever as to effect a sharp change in the leverage of said spring means as the system moves past the neutral point in either direction.

8. In apparatus of the class described, the combination with a movable surface, of a pivoted lever for the actuation of said surface, a spring means having one end fixed, an adjustable linkage connecting the moving end of said spring means to said lever in a manner as to move said lever towards a predetermined neutral position, and a connection adapted to act as a stop to prevent said spring means from carrying said lever past said neutral position.

9. The combination with an airplane having a movable control surface, of a control system adapted to actuate the control surface comprising a pivoted lever, means connecting said lever to said control surface for operation thereby, a spring means having one end in moving relation with said system, linkages connecting the free end of said spring means to said lever in unequally spaced relation to the pivot so as to impose a substantially constant force thereon for all positions of the control surface to one side of the neutral point and a substantially constant but different force to the other side of the neutral point.

10. In apparatus of the class described, the combination with a movable surface, of a pivoted lever for the actuation of said surface, a spring means having one end fixed, a linkage connecting the moving end of said spring means to said lever in a manner as to move said lever towards a predetermined neutral position, and an adjustable connection adapted to act as a stop to prevent said spring means from carrying said lever past said neutral position.

Signed at Keyport, in the county of Monmouth and State of New Jersey, this 15th day of April, 1929.

RALPH H. UPSON.